March 25, 1952 — J. M. PESTARINI — 2,590,120
SPEED CONTROL SYSTEM
Filed Sept. 23, 1948

INVENTOR
J. M. Pestarini

Patented Mar. 25, 1952

2,590,120

UNITED STATES PATENT OFFICE 2,590,120

SPEED CONTROL SYSTEM

Joseph Maximus Pestarini, Staten Island, N. Y.

Application September 23, 1948, Serial No. 50,732

5 Claims. (Cl. 318—140)

Generally in an electrical power system, a rotating machine has two fundamental members, a fixed member referred to as stator and a rotating member referred to as rotor. It may happen that it is desired to have a rotational speed between rotor and stator not equal to the absolute rotational speed of the shaft. In order to cause the differential rotational speed between the members to have the desired value independently from the absolute rotational speed of the shaft, one may drive the other member through an auxiliary rotatable machine.

The present invention is related to a control system allowing for any desired value of the differential speed between said two rotatable members independently from the absolute rotational speed of the shaft, by controlling the speed of the auxiliary machine driving the external rotatable member of the main machine.

The control system of the present invention consists essentially of a regulator dynamo driven at a speed proportional to the differential speed between said rotatable members, and able to supply a current, referred to as regulator current, varying very quickly for small discrepancies of the differential rotational speed between said rotatable members from the desired value, such regulator current may be amplified and is then adapted to energize an auxiliary dynamo which in its turn drives the external member of the machine. The value of the differential speed between the rotatable members of the machine may be set or varied, according to this invention, by varying the resistance of the circuit in which the field winding of the regulator dynamo is inserted.

As an example, electric machines will be considered in the following description and drawings but it is obvious that other machines may be treated in a similar way.

A detailed description of the invention is hereinafter given, reference being made to the accompanying drawings.

Figure 1:
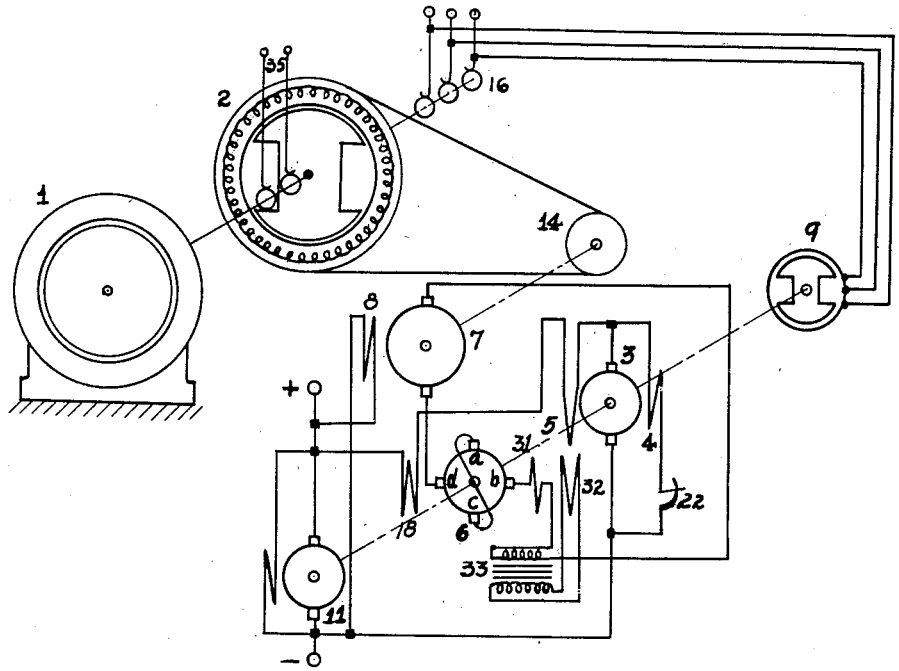
Figure 2:
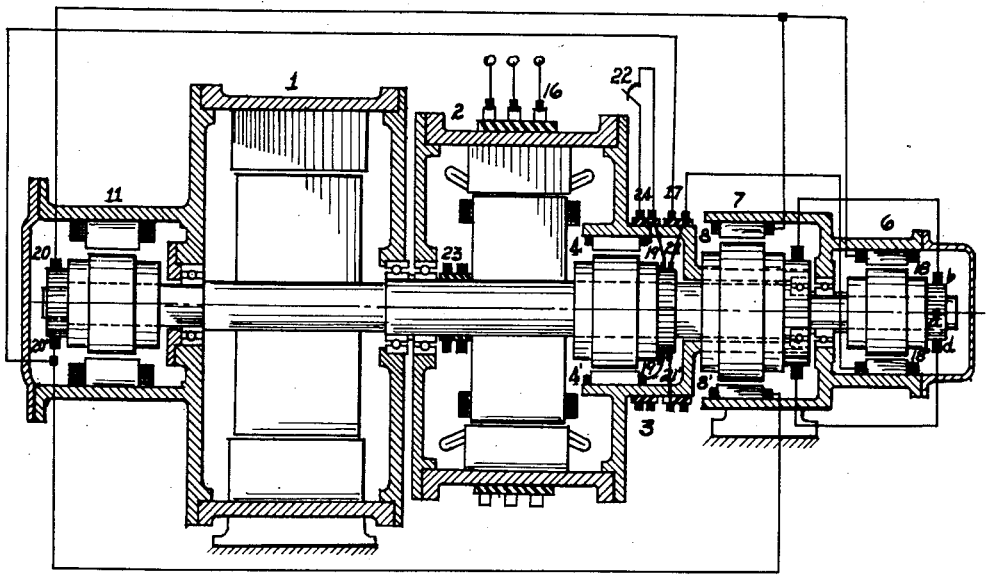

Figure 1 represents a main synchronous machine mechanically coupled to another main machine, the shaft of which rotates at a speed different from the differential speed between the two members of the main synchronous machine. The external member of said synchronous machine is shown mechanically coupled to an auxiliary dynamo by means of a pulley and a belt; Figure 2 shows a similar arrangement, the auxiliary dynamo driving said external member being directly mechanically coupled to the stator of the main machine.

Figure 1 shows a machine 1 having its stator fixed in the space and having its rotor shaft directly coupled to the field inductor of a synchronous machine 2. The armature of said machine 2 is rotatable, wearing a polyphase winding connected to sliprings 16.

The sliprings 35 connected to the field winding to carry to the said winding direct current. Then from the sliprings 16 an alternating three phase current may be collected, having a frequency proportional to the differential speed between the two rotatable members of the synchronous machine 2.

A small auxiliary synchronous motor 9 supplied with three phase currents derived from sliprings 16 rotates at a speed proportional to the frequency of the polyphase currents traversing the stator of the synchronous machine 2.

The small motor 9 drives the regulator dynamo 3 having a shunt field excitation winding 4 as main field excitation. The armature of dynamo 3 is connected to a direct current source, in the form of an auxiliary dynamo 11, driven by the shaft of the synchronous motor 9.

The regulator dynamo 3 is adapted to rotate at a critical speed. Such speed may be defined as that speed at which the resistance of the excitation circuit including the field winding 4, is equal to the ratio of the electromotive force induced by the armature of the dynamo 3 to the intensity of the exciting current traversing said excitation circuit, the iron of the magnetic circuit of the regulator dynamo being completely unsaturated. It is understood that the critical speed may be predetermined by suitably adjusting the resistance of the excitation circuit. At its critical speed the regulator dynamo will supply or absorb a current which varies very quickly for even slight departures of the frequency of the currents traversing the sliprings 16 from the desired value.

The regulator dynamo and its action has been described in many previous patents by the same author, see for instance, the United States Patent 1,962,030, patented June 1934, entitled "Rotary Transformer for Electric Currents." Its main excitation may be a shunt excitation or a series excitation.

The current supplied or absorbed by the regulator dynamo, referred to as regulator current, traverses the stator winding 18 of an amplifying metadyne 6 which is provided with brushes $a, b, c, d$, and other stator windings 31, 32. Such regulator current is amplified to any desired value so that the amplifying metadyne 6 may supply to the auxiliary dynamo 7 the necessary current for developing a sufficient torque for driving the external member of the main machine 2 through the pulley 14 coupled to dynamo 7 and a belt.

The amplifying metadyne has been the object of many improvements by the same applicant and features thereof have been schematically represented on Figure 1, for instance, an anti-hunting member of the stator winding 32 energized by the secondary winding of a transformer 33, the primary of which is inserted into the armature circuit of the auxiliary driving dynamo 7 as explained in the United States patent by the same applicant, 2,203,544, patented June 4, 1940, entitled "Power System." Similarly, the secondary compensating or hypo-compensating winding 31, interconnecting the primary of transformer 33 and the brush $b$ of the metadyne 6. The action is clearly explained in the British patent by the same applicant, 420,167, patented November 27, 1934, entitled "Improvements in Direct Current Dynamo Electric Machines."

The auxiliary driving dynamo 7 is shown independently excited through the field winding 8 by the direct current source 11, a shunt excited dynamo, preferably with a saturated magnetic circuit.

In many applications it is desired to modify the relative speed between the two members of the machine 2. According to this invention, this is obtained by modifying the resistance of the resistor 22 inserted in the circuit of the main excitation winding 14 of the regulator dynamo 3.

In order to increase the sensitiveness of the regulator dynamo 3 to the speed variations of its shaft, an auxiliary series connected excitation 5 may be provided substantially compensating the ohmic drop in the external circuit of the regulator dynamo.

The direct current source 11 and the amplifying metadyne 6 are indicated on Figure 1 as mechanically coupled to the small auxiliary synchronous motor 9. They may be driven by any other means, for instance, by the shaft of the main machine 1, but preferably they may be driven at a substantially constant speed.

In Figure 2 the external rotatable member of the machine 2 is directly mechanically coupled to the field inductor of the regulator dynamo 3 while the armature of the latter is mounted on the same shaft as the machine 2. The regulator dynamo is indicated on Figure 2 as shunt excited, the field winding 4 and 4' are indicated as traversed by a current collected through special brushes 19 and 19'. The setting rheostat 22 is inserted in the circuit of the field excitation by means of the sliprings 24. The current supplied by the regulator dynamo to its external circuit is collected by means of brushes 21 and 21' and sliprings 17.

Collecting the current of the field excitation by special brushes traversed exclusively by the excitation current increases the sensitiveness of the regulator dynamo to the speed variations between its field inductor and its armature.

The armature of the auxiliary driving dynamo 7 is indicated mechanically borne by an extension of the stator of the main machine 2. Its external member is indicated fixed with respect to the space.

The regulator dynamo 3 is connected to a direct current source, a dynamo 11 indicated on the figure as shunt excited and having its magnetic circuit preferably saturated.

The regulator current collected by the brushes 21 and 21' is carried to the brushes 20 and 20' of the direct current source 11 after having traversed a variator winding 18 and 18' of the amplifying metadyne 6.

On the figure, the secondary brushes $b$ and $d$ of the amplifying metadyne and only one primary brush, $a$, supposed connected to its diametrically opposite brush $c$, not appearing on the figure, are indicated. The current of the secondary brushes $b$ and $d$ traverses the armature of the driving auxiliary dynamo 7. The field excitation 8 and 8' of said auxiliary driving dynamo is indicated shunt connected across the terminals of the direct current source 11. A slight speed variation between rotor and stator of the main machine 2 creates a regulator current which, amplified, traverses the driving auxiliary dynamo 7 creating in it a torque sufficient to drive its armature at the speed adequately compensating the said discrepancies and causing the differential speed between the two rotatable members of the main machine 2 to keep very closely to the desired value.

In the examples given above, the regulator dynamo is indicated as shunt excited but any other dynamo as described in the previous patents by the same author may be used.

I claim:

1. In a power system comprising a machine consisting of two members rotatable about a common axis, one of said members being mechanically coupled to a power shaft rotating at a predetermined speed, a speed regulator dynamo rotatable at a critical speed, said dynamo including a field winding operative to self excite said dynamo at said critical speed, an auxiliary dynamo and an amplifier metadyne comprising an armature and at least one stator winding, means for driving said regulator dynamo at a speed proportional to the relational speed between the two members of said machine, means for coupling said auxiliary dynamo to the other rotatable member of said machine, means for connecting a stator winding of said metadyne to said regulator dynamo and means for connecting said auxiliary dynamo with the armature of said metadyne, whereby the two rotatable members of said machine are caused to rotate at a relative speed proportional to the critical speed of said regulator dynamo, independent of the rotational speed of said power shaft.

2. In a power system comprising an alternating current generator consisting of two members rotatable about a common axis, one of said members being mechanically coupled to a power shaft rotating at a predetermined speed, a speed regulator dynamo rotatable at a critical speed and comprising a field winding operative to self excite said dynamo at said critical speed, an auxiliary dynamo, an auxiliary synchronous motor and an amplifier metadyne comprising an armature and at least one stator winding, means for connecting said auxiliary synchronous motor to said alternating current generator whereby said synchronous motor rotates at a speed proportional to the frequency of the currents supplied by said generator, means for coupling said auxiliary synchronous motor to said regulator dynamo, means for coupling said auxiliary dynamo to the other rotatable member of said machine, means for connecting a stator winding of said metadyne to said regulator dynamo for energizing said metadyne and means for connecting said auxiliary dynamo with the armature of said metadyne for energizing said auxiliary dynamo, whereby the frequency of the alternating current of said generator is proportional to the critical speed of said regulator dynamo, independent of the rotational speed of said power shaft.

3. In a power system comprising a machine consisting of two members rotatable about a common axis, one of said members being mechanically coupled to a power shaft rotating at a predetermined speed, a speed regulator dynamo rotatable at a critical speed and comprising a field winding operative to self excite said dynamo at said critical speed, an auxiliary dynamo and an amplifier metadyne comprising an armature and at least one stator winding, means for driving said regulator dynamo at a speed proportional to the relational speed between the two members of said machine, means for coupling said auxiliary dynamo to the other rotatable member of said machine, means for connecting a stator winding of said metadyne to said regulator dynamo for energizing said metadyne and means for connecting said auxiliary dynamo with the armature of said metadyne for energizing said auxiliary dynamo, whereby the two rotatable members of said machine are caused to rotate at a relative speed proportional to the operational relative speed between the armature and field inductor of said regulator dynamo, independent of the rotational speed of said power shaft, resistor means for controlling the operational relative speed between armature and field inductor of said regulator dynamo by modifying the resistance of the circut of the field excitation of said regulator dynamo, said regulator dynamo comprising two sets of brushes, one set of said brushes being connected to the shunt field winding of said regulator dynamo and the other set of said brushes being adapted to be connected to said stator winding of the metadyne, said regulator dynamo being further provided with a series field winding for substantially compensating the ohmic drop in the external circuit.

4. A speed control system for a machine comprising a pair of rotatable members, rotatable about a common axis, one of said members rotating at a predetermined speed, said machine being adapted to supply polyphase current, a motor connected to said machine and rotatable at a speed proportional to the frequency of said polyphase current, a regulator dynamo coupled to said motor, said dynamo being adapted to rotate at a critical speed and including a field winding operative to self excite said dynamo at said critical speed, an auxiliary dynamo coupled to the other of said rotatable members, said regulator dynamo being adapted to provide a regulator current in response to a change in the relational speed between said rotatable members, amplifying means in circuit with said regulator dynamo and said auxiliary dynamo for supplying said auxiliary dynamo with amplified regulator current, whereby the rotatable members are caused to rotate at a relative speed proportional to said critical speed independently of the speed of said one rotatable member.

5. A system as in claim 1 and further including means for modifying the resistance of the field winding of said regulator dynamo whereby to adjust said critical speed.

JOSEPH MAXIMUS PESTARINI.

REFERENCES CITED

The following references are of record in the file of this patent:

UNITED STATES PATENTS

| Number | Name | Date |
| --- | --- | --- |
| 2,376,421 | Drake | May 22, 1945 |